(12) United States Patent
Major

(10) Patent No.: US 8,794,461 B2
(45) Date of Patent: Aug. 5, 2014

(54) CLOSURE WITH LINER SEAL VENTS

(75) Inventor: Joseph M. Major, Oregon, OH (US)

(73) Assignee: Berry Plastics Corporation, Evansville, IN (US)

( * ) Notice: Subject to any disclaimer, the term of this patent is extended or adjusted under 35 U.S.C. 154(b) by 0 days.

(21) Appl. No.: 13/571,520

(22) Filed: Aug. 10, 2012

(65) Prior Publication Data

US 2012/0298670 A1  Nov. 29, 2012

Related U.S. Application Data

(60) Continuation of application No. 12/956,817, filed on Nov. 30, 2010, now Pat. No. 8,328,038, which is a division of application No. 10/917,070, filed on Aug. 11, 2004, now Pat. No. 7,867,425.

(51) Int. Cl.
*B65D 41/02* (2006.01)

(52) U.S. Cl.
USPC ........... 215/344; 215/349; 215/350; 215/351; 215/343; 215/341

(58) Field of Classification Search
USPC .......... 220/315; 215/341, 252, 319, 349–351, 215/344, 343
See application file for complete search history.

(56) References Cited

U.S. PATENT DOCUMENTS

| | | | |
|---|---|---|---|
| 4,349,116 A | 9/1982 | Luenser | |
| 4,407,422 A * | 10/1983 | Wilde et al. | 215/246 |
| 4,418,828 A * | 12/1983 | Wilde et al. | 215/252 |
| 4,497,765 A | 2/1985 | Wilde et al. | |
| 4,651,886 A | 3/1987 | Stull | |
| 4,664,280 A * | 5/1987 | Whitney et al. | 215/350 |
| 4,721,221 A * | 1/1988 | Barriac | 215/350 |
| 4,801,030 A * | 1/1989 | Barriac | 215/252 |
| 4,984,703 A | 1/1991 | Burzynski | |
| 5,009,324 A * | 4/1991 | Ochs | 215/276 |
| 5,064,084 A | 11/1991 | McBride et al. | |
| 5,564,319 A * | 10/1996 | Kowal | 82/46 |
| 5,579,936 A | 12/1996 | Costa et al. | |
| 5,730,306 A | 3/1998 | Costa et al. | |
| 5,762,219 A | 6/1998 | Parrinello | |
| 5,800,764 A * | 9/1998 | Smeyak et al. | 264/268 |
| 5,884,790 A | 3/1999 | Seidita | |
| 6,202,872 B1 | 3/2001 | Smeyak et al. | |

(Continued)

FOREIGN PATENT DOCUMENTS

| | | |
|---|---|---|
| EP | 0 073 334 | 3/1983 |
| EP | 0073334 | 3/1983 |
| EP | 0 219 265 | 4/1987 |
| EP | 0219265 | 4/1987 |

(Continued)

*Primary Examiner* — Galen Hauth
(74) *Attorney, Agent, or Firm* — Barnes & Thornburg LLP

(57) ABSTRACT

A plastic closure includes a shell having a base wall with a skirt for securement to a container finish and a lip that extends radially inwardly from the skirt at a position adjacent to and spaced from the base wall. A liner is compression molded in situ against the base wall, and between the base wall and the lip. The lip has a plurality of circumferentially spaced passages that extend through the lip for venting air during compression molding of the liner.

13 Claims, 3 Drawing Sheets

(56) References Cited

U.S. PATENT DOCUMENTS

| | | | |
|---|---|---|---|
| 6,382,444 B1* | 5/2002 | Nyman | 215/252 |
| 6,660,349 B1 | 12/2003 | Bourgeois | |
| 6,702,133 B1 | 3/2004 | Shenkar et al. | |
| 7,264,131 B2* | 9/2007 | Tsutsumi et al. | 215/252 |
| 7,306,108 B2* | 12/2007 | Cleevely | 215/307 |
| 8,328,038 B2 | 12/2012 | Major | |
| 2001/0015341 A1* | 8/2001 | Higgins | 215/252 |
| 2002/0162818 A1 | 11/2002 | Williams | |
| 2003/0127421 A1 | 7/2003 | Ziegler et al. | |
| 2005/0199574 A1* | 9/2005 | Bloom et al. | 215/252 |
| 2005/0284837 A1* | 12/2005 | Taber et al. | 215/276 |
| 2007/0187352 A1* | 8/2007 | Kras et al. | 215/350 |

FOREIGN PATENT DOCUMENTS

| | | |
|---|---|---|
| EP | 0 688 723 | 12/1995 |
| EP | 0688723 | 12/1995 |
| EP | 0 770 559 | 5/1997 |
| EP | 0770559 | 5/1997 |
| EP | 0 987 190 | 3/2000 |
| EP | 0987190 | 3/2000 |
| JP | 03-124570 | 3/1989 |
| JP | 3-124570 | 5/1991 |
| WO | 96/20879 | 7/1996 |

* cited by examiner

CLOSURE WITH LINER SEAL VENTS

This application is a division of application Ser. No. 10/917,070 filed Aug. 11, 2004.

The present invention relates to compression molding sealing liners within closure shells, and more particularly to venting the compression mold cavity to prevent formation of bubbles in the liner.

BACKGROUND AND SUMMARY OF THE INVENTION

Plastic closures for many types of beverage, food, juice, pharmaceutical and like applications include a plastic shell that has a lip extending radially inwardly from the closure skirt at a position adjacent to but spaced from the inside surface of the closure shell base wall. A sealing liner is compression molded in situ on the inside surface of the closure base wall, with the lip cooperating with compression mold tooling to form the mold cavity. U.S. Pat. Nos. 4,984,703 and 6,660,349 illustrate closures of this type. It has been proposed to provide vent passages in the liner compression mold tooling to vent air from the mold cavity as the liner is being molded. However, passages in the liner compression mold tooling can become clogged or obstructed, preventing proper ventilation of the mold cavity and leading to entrapment of air bubbles in the liner. This, in turn, undesirably increases the production scrap rate and therefore the cost of producing the closures. It is a general object of the present invention to provide a closure in which the liner compression mold cavity is vented through the closure shell rather than through the mold tooling, thereby enhancing the venting of air from the mold cavity, reducing or eliminating entrapment of air bubbles in the liners, and reducing the closure scrap rate and the cost of production.

A closure shell in accordance with one aspect of the invention includes a base wall with a skirt for securement to a container finish, a lip that extends radially inwardly from the skirt at a position adjacent to but spaced from the base wall, and at least one passage that extends through the lip. In the preferred embodiment of the invention, the passage is in the form of a channel that opens at a radially inner edge of the lip and at axially spaced surfaces of the lip. The channel preferably has a radially inwardly facing surface that angles axially away from the base wall and radially inwardly from the skirt. The lip preferably has a surface that faces axially away from the base wall, with at least a portion adjacent to a radially inner edge of the lip that is flat and perpendicular to the axis of the skirt. The channel preferably opens at this flat portion of the axially facing lip surface.

A plastic closure in accordance with another aspect of the presently preferred embodiment of the invention includes a shell having a base wall with a skirt for securement to a container finish and a lip that extends radially inwardly from the skirt at a position adjacent to and spaced from the base wall. A liner is compression molded in situ against the base wall, and between the base wall and the lip. The lip has a plurality of circumferentially spaced passages that extend through the lip for venting air during compression molding of the liner.

BRIEF DESCRIPTION OF THE DRAWINGS

The invention, together with additional objects, features, advantages and aspects thereof, will best be understood from the following description, the appended claims and the accompanying drawings, in which:

DETAILED DESCRIPTION OF PREFERRED EMBODIMENTS

Figure 1:
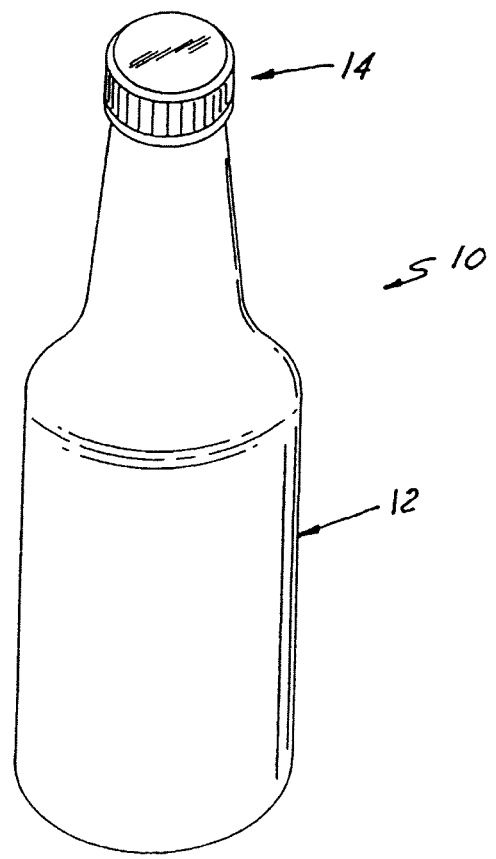
FIG. 1 is a perspective view of a package that includes a container and a closure in accordance with one presently preferred embodiment of the invention.

FIG. 1 illustrates a package 10 as comprising a container 12 of glass or plastic construction and a plastic closure 14 secured to the finish of container 12. Closure 14 preferably is secured to container 12 by means of one or more internal threads (or thread segments) on closure 14 in engagement with one or more external threads (or thread segments) on the finish of container 12.

Figure 3:
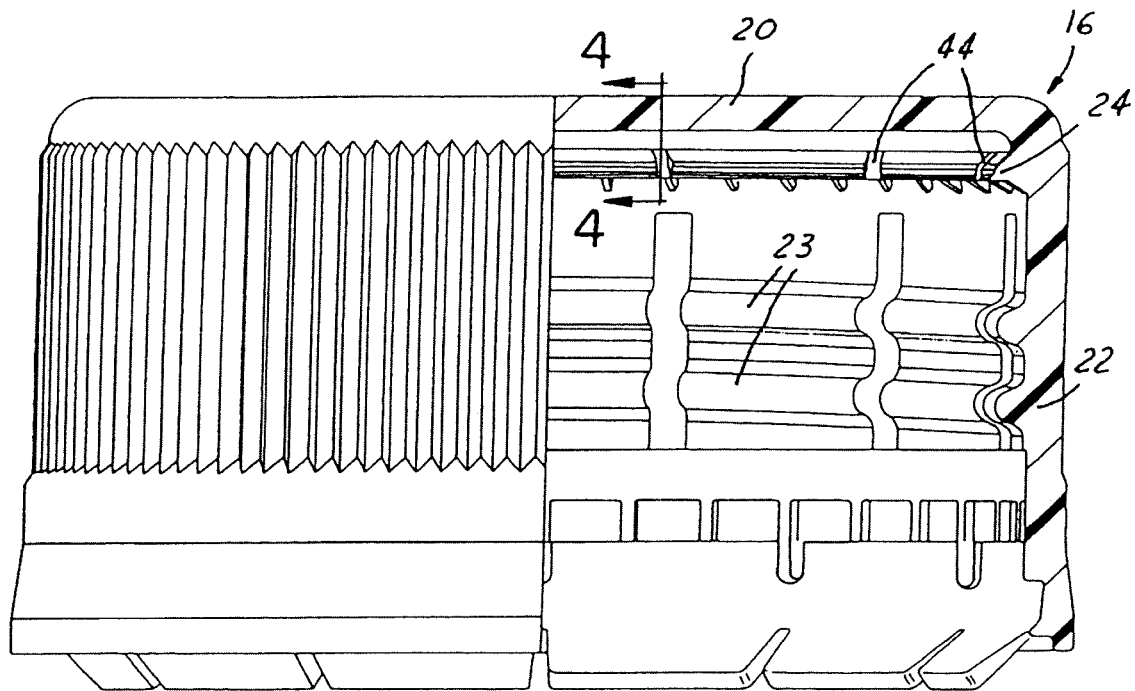
FIG. 3 is a partially sectioned elevational view of the as-molded closure shell in the closure of FIGS. 1 and 2.
Figure 2:
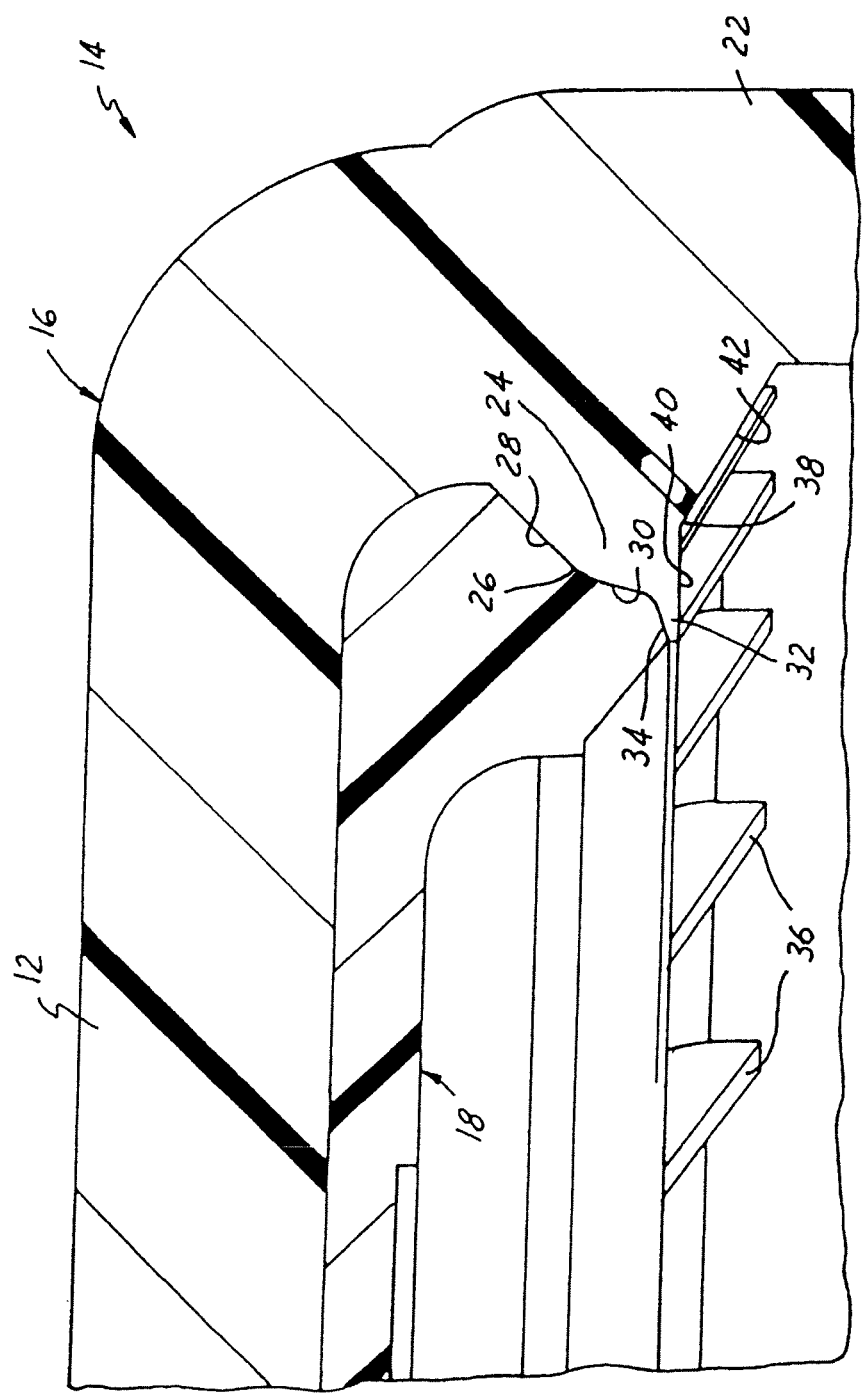
FIG. 2 is a fragmentary sectional view of the closure in the package of FIG. 1.

FIG. 2 illustrates plastic closure 14 in accordance with one presently preferred embodiment of the invention as comprising a plastic cap or shell 16 and a plastic liner 18 compression molded in situ within shell 16. Shell 16 includes a base wall 20 and a peripheral skirt 22 having one or more internal threads (or thread segments) 23 (FIG. 3) for securing the closure to the finish of container 12 (FIG. 1). A circumferentially continuous annular lip 24 integrally extends radially inwardly from skirt 22 adjacent to but axially spaced from base wall 20. Lip 24 has an interior surface 26—i.e., a facing the opposing interior surface of base wall 20—disposed at an acute angle to base wall 20. Specifically, in the preferred embodiment, surface 26 includes a first conical surface portion 28 adjacent to skirt 22 at a first acute angle to base wall 20, and a second conical surface portion 30 extending from surface portion 28 at a second acute angle to base wall 20. An edge 32 forms a third surface 34 at a third acute angle to the base wall. Lip 24 has a surface 38 that faces axially away from base wall 20. This surface 38 preferably includes a first portion 40 adjacent to the radially inner edge of lip 24 that is flat and perpendicular to the axis of closure skirt 22 (i.e.—perpendicular within the tolerances of the shell mold tooling), and a second radially outer portion 42 that is at an angle to the axis of the closure skirt. In one exemplary embodiment of the invention for a 38 mm finish, surface portion 28 is at an angle of 45°, surface portion 30 is at an angle of 10°, surface portion 34 is at an angle of 72° and surface portion is 42 is at an angle of 60°, all with respect to the central axis of skirt 22.

Figure 4:
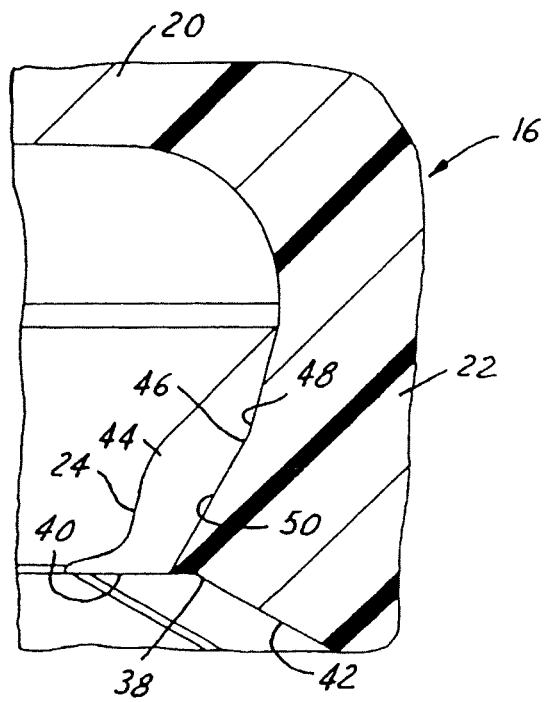
FIG. 4 is a fragmentary sectional view taken substantially along the line 4-4 in FIG. 3.

A circumferential array of angularly spaced air vent openings extend through lip 24. These air vent openings preferably are in the form of slots or channels 44 that open at the radially inner edge of lip 24, and at the upper and lower surfaces of lip 24. Channels 44 have a radially inwardly facing surface 46 at an angle to the axis of the closure skirt. Surface 46 is a compound surface in the illustrated embodiment, having a first portion 48 adjacent to skirt 22 at a first angle to the skirt axis, and a second portion 50 that extends to lip surface 40 at a second greater angle to the skirt axis. The angle of surface portion 50 controls the depth of the vent and the vent air flow rate. The angle of surface portion 48 is for tool design purposes, and could be the same as the angle of portion 50. Surface portion 48 in the exemplary embodiment of the invention is at an angle of 15.5° to the closure axis, while surface portion 50 is at an angle of 27.5°. The upper end of surface 40 preferably is at the inside surface of closure skirt 22, while the lower surface of surface 50 preferably is at the juncture of lip surface portions 40 and 42. (Directional words such as "upper" and "lower" are employed by way of description and not limitation with respect to the upright orientation of the closure and shell illustrated in FIGS. 2-4. Directional words such as "axial" and "radial" are employed by way of description and not limitation with respect to the central axis of closure skirt 22 All exemplary dimensions and angles are nominal.) In the exemplary embodiment of the invention, there are twelve vent channels 44 equally spaced around lip 24, with each channel being about 0.025 inch wide. Air vent channels 44 preferably are molded into lip 24 during injection or compression molding of the closure shell. As an alternative, vent channels 44 can be scored or otherwise formed in lip 24 in a post-molding operation.

Figure 5:
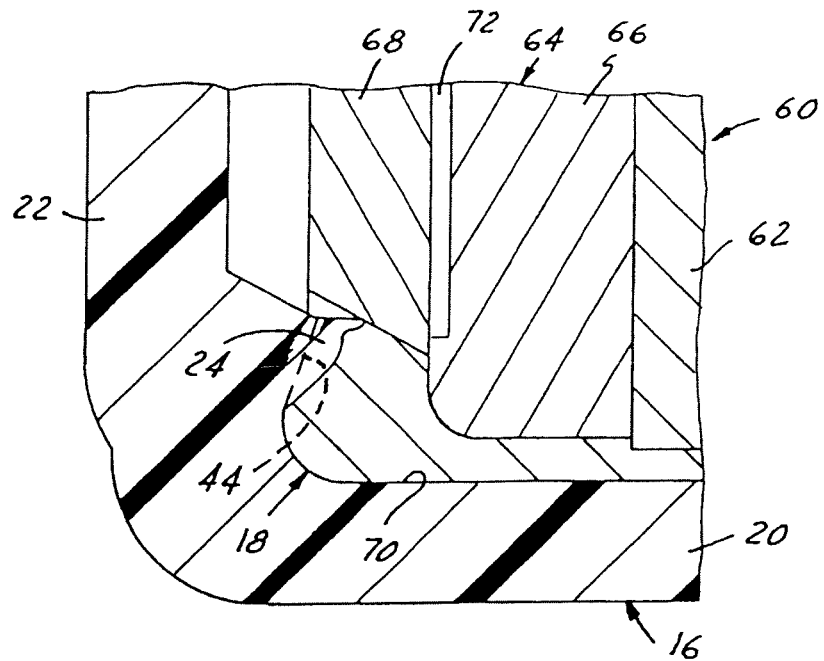
FIG. 5 is a fragmentary schematic diagram that illustrates tooling for compression molding a liner in the closure shell of FIGS. 3-4.

Sealing liner 18 is compression molded in situ against base wall 20, and between base wall 20 and lip 24. Liner 18 may be of any suitable construction, such as disclosed for example in any one of U.S. Pat. Nos. 4,984,703, 5,306,542, 6,371,318, 6,399,170 and 6,660,349. FIG. 5 is a schematic illustration of tooling 60 for compression molding liner 18 within shell 16. Such tooling preferably includes a liner tip 62 that is slidably mounted within a sleeve assembly 64. Sleeve assembly 64 preferably includes an inner sleeve 66 and an outer sleeve 68 that, together with tip 62 and closure shell 16, form a cavity 70 for compression molding liner 18. An air vent passage 72 is provided between sleeves 66,68. The lower face of sleeve 68 (in the orientation of FIG. 5) engages lip surface portion 40 and the radially inner edge of lip 24 to close cavity 70. Vent channels 44 in lip 24 open to the lower face of sleeve 68. During molding of liner 18, a charge of liner material is placed within shell 16 with mold tooling 60 retracted. The mold tooling is then moved into the shell, with sleeves 66, 68 brought into the positions illustrated in FIG. 5. Liner tip 62 is then moved further into the shell to compress the charge of liner material and cause the liner material to flow outwardly toward the periphery of cavity 70. The air displaced by this material flow can vent through channels 44 and radially outwardly around sleeve 68 so as to prevent entrapment of the air as pockets or bubbles within the liner.

There thus have been disclosed a closure shell, a plastic closure, and a method of making a plastic shell and closure that fully satisfy all of the objects and aim previously set forth. The invention has been disclosed in conjunction with a presently preferred embodiment thereof, and a number of modifications and variations have been discussed. Other modifications and variations will readily suggest themselves to persons of ordinary skill in the art in view of the foregoing description. For example, the principles of the present invention are illustrated in conjunction with a cold soft drink closure having vent slots in the threads and a tamper band at the edge of the skirt; however, the invention is by no means limited to closures of this type. The invention is intended to embrace all such modifications and variations as fall within the spirit and broad scope of the appended claims.

The invention claimed is:

1. A closure shell that includes a base wall with a skirt for securement to a container finish, a lip that extends radially inwardly from said skirt at a position adjacent to and spaced from said base wall, at least one passage formed in the lip and spaced apart from the skirt, the at least one passage extending through said lip and the lip being adapted to vent air during compression molding of a liner in space between the base wall and lip.

2. The closure shell set forth in claim 1 wherein said at least one passage includes a plurality of circumferentially spaced passages.

3. The closure shell set forth in claim 1 wherein said at least one passage includes at least one channel that opens at a radially inner edge of said lip and at axially spaced surfaces of said lip.

4. The closure shell set forth in claim 3 wherein said at least one channel has a radially inwardly facing surface that angles axially away from said base wall and radially inwardly from said skirt.

5. A plastic closure that includes:
a shell having a base wall with a skirt for securement to a container finish and
a lip that extends radially inwardly from said skirt at a position adjacent to and spaced from said base wall, and a liner compression molded in situ against said base wall, and between said base wall and said lip, said lip having a plurality of circumferentially spaced passages formed in the lip that are spaced apart from and extend through said lip and are adapted for venting air during compression molding of said liner.

6. The closure set forth in claim 5 wherein said plurality of circumferentially spaced passages include a plurality of circumferentially spaced channels that open at a radially inner edge of said lip and at axially spaced surfaces of said lip.

7. A closure comprising
a shell including a base wall and a skirt coupled to the base wall to extend away from the base wall, the skirt having means for securing to a container finish included in a container,
a lip appended to the skirt and arranged to extend radially inwardly from the skirt at a position between the base wall and the means for securing, and
a channel formed in the lip by an inwardly facing surface of the lip, the inwardly facing surface of the lip being spaced apart from the skirt and the channel comprising means for venting air during compression molding of a liner in space between the base wall and lip.

8. The closure of claim 7, wherein the inwardly facing surface includes a first portion adjacent to the skirt at a first angle relative to a skirt axis and a second portion that extends to a surface of the lip at a relatively greater second angle relative to the skirt axis.

9. The closure of claim 7, wherein the channel is formed after forming the lip.

10. The closure of claim 7, wherein the channel and lip are formed together by molding.

11. The closure shell set forth in claim 1 wherein said lip is a circumferentially continuous annular lip.

12. The closure shell set forth in claim 5 wherein said lip is a circumferentially continuous annular lip.

13. The closure shell set forth in claim 7 wherein said lip is a circumferentially continuous annular lip.

* * * * *